United States Patent
Uttley et al.

(10) Patent No.: US 10,769,038 B2
(45) Date of Patent: Sep. 8, 2020

(54) COUNTER CIRCUITRY AND METHODS INCLUDING A MASTER COUNTER PROVIDING INITIALIZATION DATA AND FAULT DETECTION DATA AND WHEREIN A THRESHOLD COUNT DIFFERENCE OF A FAULT DETECTION COUNT IS DEPENDENT UPON THE FAULT DETECTION DATA

(71) Applicant: Arm Limited, Cambridge (GB)

(72) Inventors: Peter Uttley, Nottingham (GB); Kar Lik Kasim Wong, Wokingham (GB)

(73) Assignee: Arm Limited, Cambridge (GB)

(*) Notice: Subject to any disclaimer, the term of this patent is extended or adjusted under 35 U.S.C. 154(b) by 204 days.

(21) Appl. No.: 16/109,942

(22) Filed: Aug. 23, 2018

(65) Prior Publication Data

US 2020/0065200 A1 Feb. 27, 2020

(51) Int. Cl.
*G06F 1/12* (2006.01)
*G06F 11/16* (2006.01)
(Continued)

(52) U.S. Cl.
CPC ............ *G06F 11/1604* (2013.01); *G06F 1/06* (2013.01); *G06F 1/12* (2013.01); *G04G 7/00* (2013.01);
(Continued)

(58) Field of Classification Search
CPC ... H03L 7/08; H03L 7/14; H03L 7/146; H03L 7/148; H04L 41/064; H04L 43/0852;
(Continued)

(56) References Cited

U.S. PATENT DOCUMENTS 10,148,412 B1 * 12/2018 Chu ..................... H04L 69/28
2004/0158759 A1 * 8/2004 Chang ..................... G06F 1/06
713/500

(Continued)

OTHER PUBLICATIONS

Crawford et al., U.S. Appl. No. 15/683,962, filed Aug. 23, 2017.

*Primary Examiner* — Joseph O Schell
(74) *Attorney, Agent, or Firm* — Nixon & Vanderhye P.C.

(57) ABSTRACT

Apparatus comprises master counter circuitry to generate a master count signal in response to a clock signal; slave counter circuitry responsive to the clock signal to generate a respective slave count signal, the slave counter circuitry having associated fault detection circuitry; and a synchronisation connection providing signal communication between the master counter circuitry and the slave counter circuitry, the master counter circuitry being configured to provide via the synchronisation connection: initialisation data at an initialisation operation; and fault detection data at a fault detection operation; the initialisation data and subsequent fault detection data each representing respective indications of a state of the master count signal; the slave counter circuitry being configured, during an initialisation operation for that slave counter circuitry, to initialise a counting operation of that slave counter circuitry in response to the initialisation data provided by the master counter circuitry; and the fault detection circuitry associated with the slave counter circuitry being configured, during a fault detection operation for that slave counter circuitry, to detect whether a counting operation of that slave counter circuitry generates a slave count signal which is within a threshold count difference of a fault detection count value dependent upon the fault detection data provided by the master counter circuitry.

20 Claims, 8 Drawing Sheets

(51) Int. Cl.
    *G06F 1/06*    (2006.01)
    *H04J 3/06*    (2006.01)
    *H04L 12/26*   (2006.01)
    *G04G 7/00*    (2006.01)
    *H04W 56/00*   (2009.01)

(52) U.S. Cl.
    CPC ........... *H04J 3/0638* (2013.01); *H04J 3/0644* (2013.01); *H04L 43/0852* (2013.01); *H04L 43/0858* (2013.01); *H04W 56/001* (2013.01)

(58) Field of Classification Search
    CPC ............. H04L 43/0858; H04L 43/0864; H04L 7/0008; H04L 7/0012; G04G 7/00; H04W 56/001; G06F 1/12; G06F 1/14; G06F 11/006; G06F 11/0709; G06F 11/1604; H04J 3/0638; H04J 3/0644; H04J 3/0647; H04J 3/0652; H04J 3/0661; H04J 3/0667
    See application file for complete search history.

(56) References Cited

U.S. PATENT DOCUMENTS

| | | | |
|---|---|---|---|
| 2011/0228834 A1* | 9/2011 | Umayabashi | H03L 7/08 |
| | | | 375/224 |
| 2014/0334582 A1* | 11/2014 | Bock | H04J 3/0667 |
| | | | 375/356 |
| 2018/0356855 A1* | 12/2018 | Kamiyama | G04G 7/00 |

* cited by examiner

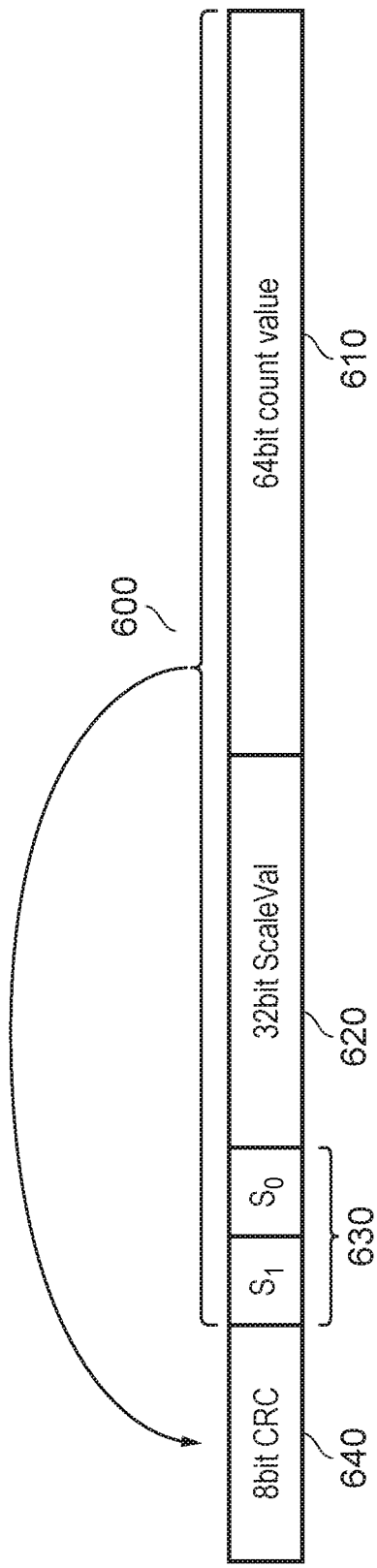
FIG. 6
FIG. 7
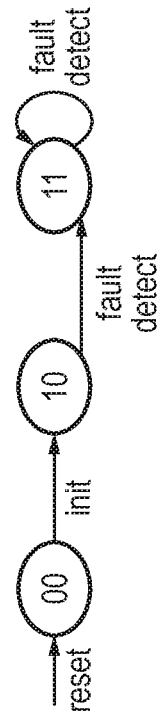
FIG. 8

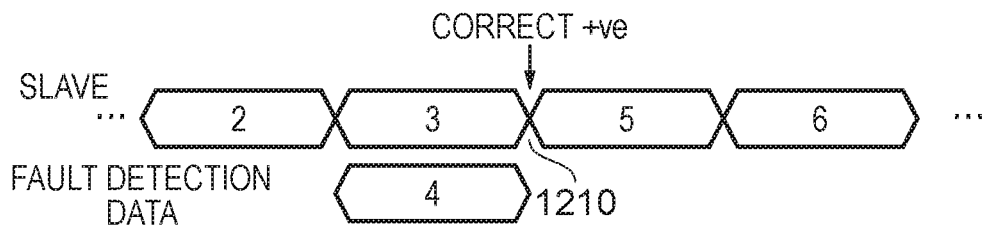
FIG. 12A
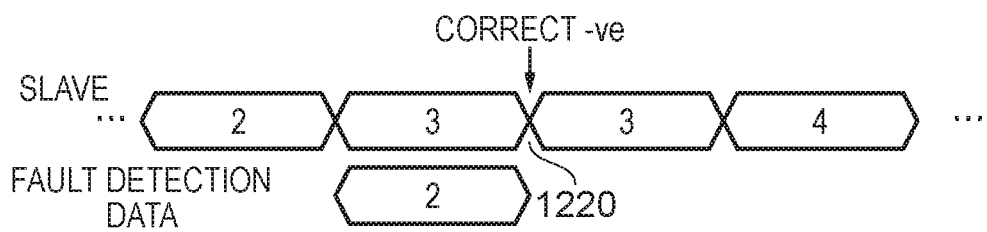
FIG. 12B
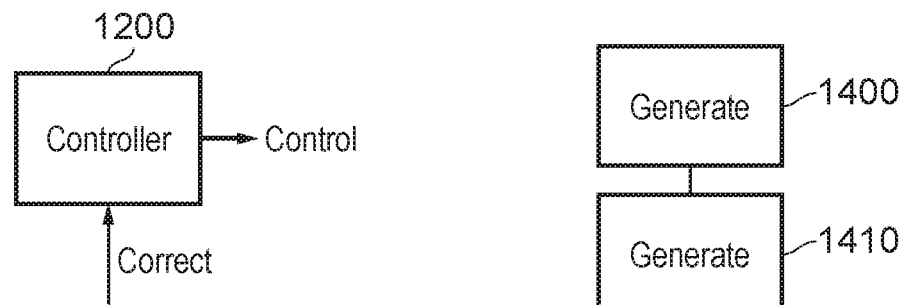
FIG. 12C
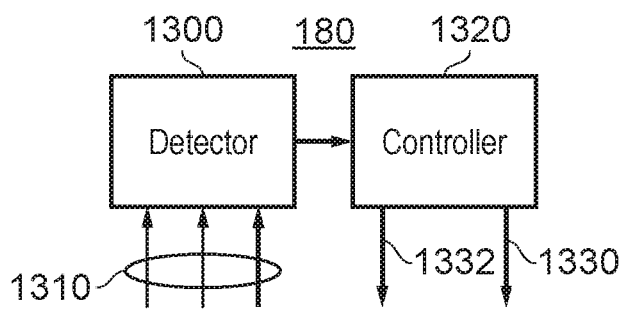
FIG. 13
FIG. 14

US 10,769,038 B2

COUNTER CIRCUITRY AND METHODS INCLUDING A MASTER COUNTER PROVIDING INITIALIZATION DATA AND FAULT DETECTION DATA AND WHEREIN A THRESHOLD COUNT DIFFERENCE OF A FAULT DETECTION COUNT IS DEPENDENT UPON THE FAULT DETECTION DATA

BACKGROUND

This disclosure relates to counter circuitry and methods.

Some data processing apparatuses have a central 'always-on' source of time, known as the system counter, that monotonically increases. This continuous count source is distributed to all processing elements in the system in such a way that the observation of this source is consistent and does not, through communication between processors, lead to time appearing to move backwards.

Some techniques for distributing this signal involve using distributed counters. Each distributed counter must be accurately synchronized to the current, continuously incrementing, always-on system counter when it is powered-on and before any processor observes it.

SUMMARY

In an example arrangement there is provided apparatus comprising:

master counter circuitry to generate a master count signal in response to a clock signal;

slave counter circuitry responsive to the clock signal to generate a respective slave count signal, the slave counter circuitry having associated fault detection circuitry; and a synchronisation connection providing signal communication between the master counter circuitry and the slave counter circuitry, the master counter circuitry being configured to provide via the synchronisation connection:

initialisation data at an initialisation operation; and fault detection data at a fault detection operation;

the initialisation data and subsequent fault detection data each representing respective indications of a state of the master count signal;

the slave counter circuitry being configured, during an initialisation operation for that slave counter circuitry, to initialise a counting operation of that slave counter circuitry in response to the initialisation data provided by the master counter circuitry; and the fault detection circuitry of the slave counter circuitry being configured, during a fault detection operation for that slave counter circuitry, to detect whether a counting operation of that slave counter circuitry generates a slave count signal which is within a threshold count difference of a fault detection count value dependent upon the fault detection data provided by the master counter circuitry.

In another example arrangement there is provided a method comprising:

master counter circuitry generating a master count signal in response to a clock signal;

slave counter circuitry generating a respective slave count signal the master counter circuitry providing to the slave counter circuitry via the synchronisation connection:

initialisation data at an initialisation operation; and fault detection data at a fault detection operation;

the initialisation data and subsequent fault detection data each representing respective indications of a state of the master count signal;

the slave counter circuitry, during an initialisation operation for that slave counter circuitry, initialising a counting operation of that slave counter circuitry in response to the initialisation data provided by the master counter circuitry; and fault detection circuitry of the slave counter circuitry detecting, during a subsequent fault detection operation for that slave counter circuitry, whether a counting operation of that slave counter circuitry generates a slave count signal which is within a threshold count difference of a fault detection count value dependent upon the fault detection data provided by the master counter circuitry.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 6 schematically illustrates an example format of initialisation data and fault detection data;

FIG. 7 schematically illustrates a status field;

FIG. 8 is a schematic state diagram illustrating the use of initialisation and fault detection data;

FIGS. 12A to 12C schematically illustrate a correction operation;

FIG. 13 schematically illustrates a control circuitry; and

FIG. 14 is a schematic flowchart illustrating a method.

DESCRIPTION OF EMBODIMENTS

Figure 1:
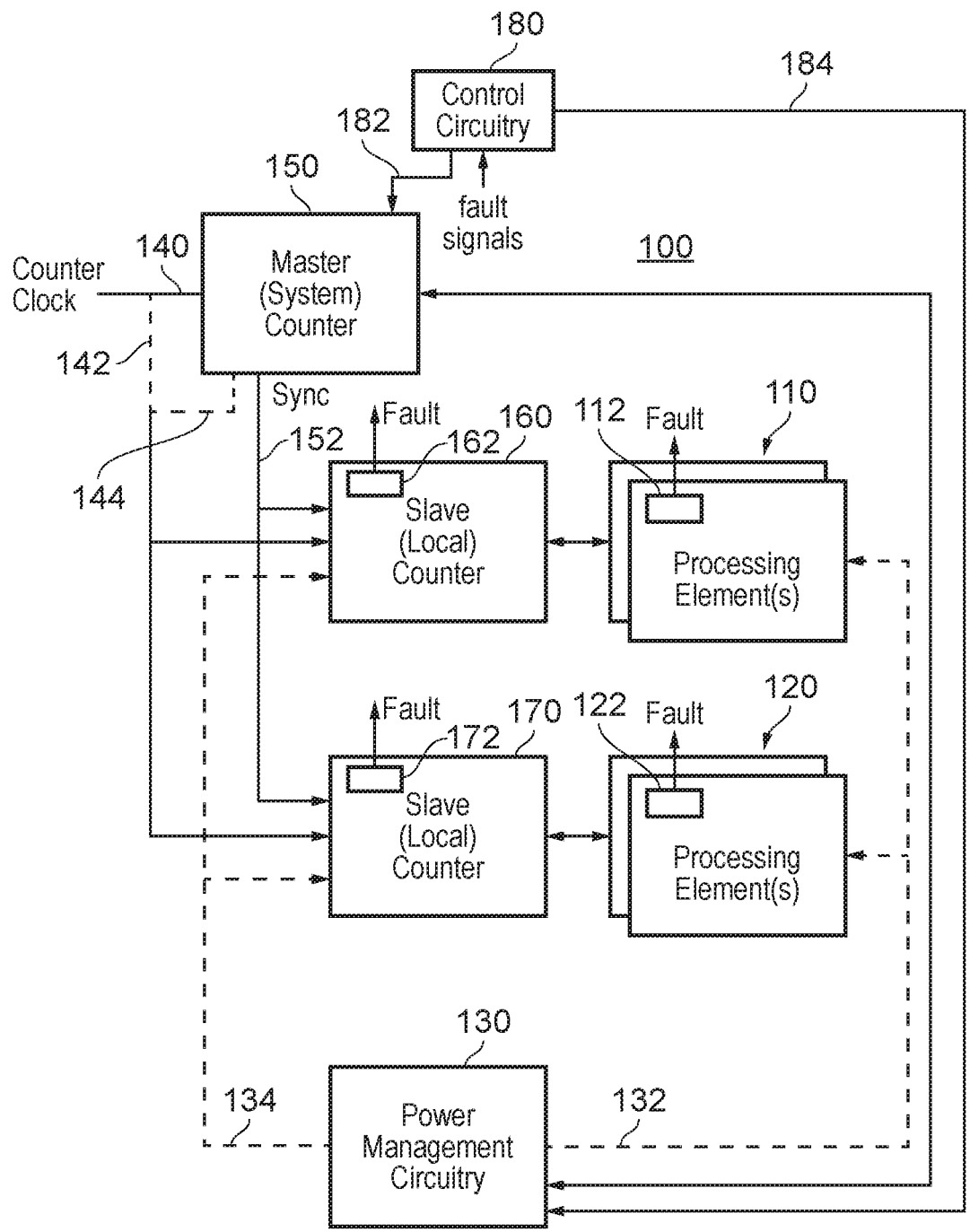
FIG. 1 schematically illustrates apparatus embodied as an integrated circuit.

Referring now to the drawings, FIG. 1 schematically illustrates an apparatus 100 embodied as an integrated circuit, for example a so-called system-on-chip (SoC) or network-on-chip (NoC). Those features of the apparatus 100 relevant to the present discussion are illustrated; other features or circuitry may also be provided and are not shown in FIG. 1.

The apparatus comprises multiple processing elements (PEs) or CPU (central processing unit) clusters 110, 120 (where a cluster comprise one or more PEs) to carry out data processing operations. As part of their functionality, they can be powered-up or down (which is to say, transitioned between a quiescent state and an operational state), under the control of power management circuitry 130 using control signals 132 to control a supply of power to the processing elements 110, 120. Another aspect of their operation is to access a count value based upon counter circuitry counting cycles of a counter clock 140. The way in which the count values are made available to the processing elements 110, 120 will be discussed in detail below.

In place of or in addition to the processing elements 110, 120, other devices (not shown) can make use of the count values generated by the slave counters. For example, a so-called system timer (which may issue an interrupt or other signal when the count reaches a multiple of a particular value representing an interrupt period) may be used. A so-called watchdog timer may detect, for example, a lack of activity or the like by a particular part of the circuitry for a predetermined period based on detecting count values. A graphics processing unit or the like may generate or output video signals according to a frame periodicity derived from the count values. Other uses of the count values may also be provided.

A master (system) counter 150 provides a central "always-on" source of a time count signal, for example using a 64 bit counter (noting that counting to $2^{64}$ represents a long period of running of even a high frequency clock). This master counter operates to count cycles of the counter clock 140 in such a way that the count value which it generates always monotonically increases. This continuous count value needs to be distributed to all processing elements in the apparatus in such a way that the observation (by any processing element) of the count value is consistent and can never (through communication of data dependent upon the count values between processing elements, or otherwise), lead to a situation in which time according to the count values appears to move backwards.

To avoid having to provide large (wide) on-chip buses for the count values, each operating at high speed, one or more slave (local) counters 160, 170 are provided. This arrangement means that the slave or local counters 160, 170 are synchronised to the counting operation carried out at the master (system) counter 150, that are provided locally to the processing elements 110, 120 so that long, wide, high speed count value buses are not required. Therefore, the count generated by the master counter circuitry does not itself need to be continuously distributed, but it is maintained and used for the distribution of synchronisation information to allow the local counter(s) to be synchronised to the count of the master counter.

Various aspects of the use of master and slave counters are described in U.S. patent application Ser. No. 15/683,962, the contents of which are incorporated into the present description by reference.

The slave (local) counters 160, 170 are also capable of being transitioned between a quiescent and an operational state, again under the control of a control signal 134 from the power management circuitry 130.

As part of its operation, the master counter 150 provides a signal to synchronise operation of the slave counters 160, 170. This can be provided by a serial connection 152 referred to as "Sync". The data connection Sync 152 can provide an example of a synchronisation connection provides serial communication of the data indicative of a count value and also a timing signal. In example arrangements, this can be sent identically to all of the slave counters. In some examples, it may be assumed that the transmission delay for sending this information is the same for all slave counters.

For example, the synchronisation connection can comprise a single conductive path (a single "wire" or conductive path on or in the integrated circuit) or a set of conductive paths which is narrower than the number of bits in the data to be sent from the master counter to the slave counters (so that the data indicative of a count value has to be sent serially as a series of two or more transmissions), from the master counter circuitry to the slave counter circuitry. The data indicative of a count value can be sent, for example, before the timing signal (in the case of a single conductive path) or in a situation where the Sync data connection 152 is such that both can be sent at the same time, the timing signal (or "data valid" signal as it is referred to in timing diagrams to be discussed below) can be sent so as to overlap in time with the sending of the count value, for example, at the same time as a last bit or portion of the packet including the count value.

The slave counters are also responsive to the counter clock 140. As illustrated by the alternative paths represented by broken lines 142, 144, the counter clock 140 can be provided directly to the slave counters 160, 170 or can be provided via the master counter 150, the latter arrangement allowing the master counter to gate the counter clock 140.

In the present examples, the counter clock 140 is provided as a 1 GHz clock signal, which is subject to a division-by-four to provide a 250 MHz clock signal which actually forms the basis of the counting operations by the master counter 150 and the slave counters 160, 170. The 1 GHz signal is used in these examples as a sampling clock for the slave counters to sample signals transmitted from the master counter 150. These aspects of the operations will be discussed further below.

Note that the master counter 150 does not in fact need the 1 GHz clock signal. Therefore, the arrangement could be that the master counter 150 and the slave counters 160, 170 . . . all receive the 250 MHz clock but only the slave counters 160, 170 . . . also receive the 1 GHz clock signal for use as a sampling clock. Or in another alternative, the master counter 150 receives just the 250 MHz clock (having been derived from the 1 GHz clock) while the slave counters receive the 1 GHz clock from which they derive the 250 MHz clock by a division by four. Various permutations are possible, but in general the 250 MHz clock signals against which all of the counters (master and slave) carry out their counting operations have the same clock frequency, having been derived from a common source, though potentially a non-zero phase relationship because of transmission delays around the circuit. In some examples the slave counters 160, 170 may receive clock signals having the same phase relationship relative to the clock signal used by the master clock, though this is not necessary. Note that the values of 250 MHz and 1 GHz are merely examples. The use of a sampling clock at the slave counters having a higher frequency (1 GHz in this example) than the counter clock (250 MHz in this example) is also not an essential feature, though it does provide for potentially more rapid sampling and detection of signals received from the master counter.

The power management circuitry 130 provides power management of the various elements in the apparatus 100. Elements which are controlled between the operational and quiescent states together, which is to say they transition collectively as a group, can be referred to as representing a "power island". So, the processing elements 110 may be individually controllable from a power management point of view, or could operate together in a power island. In FIG. 1 as drawn, there are potentially 4 power islands: the slave counter 160, the slave counter 170, the processing elements 110 and the processing elements 120, so providing an example in which two or more slave counter circuitries are separately controllable by the power management circuitry between the quiescent state and the operational state. In other arrangements, each slave counter 160, 170 could form a respective power island with its associated processing elements 110, 120, so that the units 160, 110 form a single power island, and the units 170, 120 form another power island for example.

Therefore the power management circuitry 130 can provide an example of power management circuitry to control transitions of the slave counter circuitry between an operational state and a quiescent state. The processing elements 110, 120 can provide an example of one or more processing elements configured to perform processing operations in response to the slave count signal, the power management circuitry 130 being configured to control transitions of the one or more processing elements between an operational state and a quiescent state.

Note that although two slave counters and two groups of processing elements are shown in FIG. 1, there could in fact be just one slave counter or there could be multiple slave counters, and the number of processing elements is variable according to the system design and the capacity (in terms of space, for example) on the integrated circuit.

The issue of power management is relevant to the use of local or slave counters, in that a slave counter, when transitioned from a quiescent to an operational state, needs to be synchronised so that its count operation is time-aligned (count-aligned) with the count operation of the master counter 150. Techniques to achieve these arrangements will be discussed below.

In association with the operation of each slave counter, fault detection circuitry 112, 122, 162, 172 is provided. This may form part of the respective slave counter itself (as in the case of the fault detection circuitry shown schematically as 162, 172) or may (as also shown schematically in FIG. 1 by the fault detection circuitry 112, 122) be implemented as part of the functionality of the processing elements (or CPU clusters) 110, 120. In some examples, both types of fault detection circuitry may be provided, which is to say that some fault detection functionality may be carried out at the slave counter and some at the unit or circuitry which uses the slave count, such as at the processing element(s). In other examples, only one of these types of fault detection circuitry needs to be provided. The fault detection circuitries are configured so as to generate a "fault" signal in response to a detection of certain circumstances to be discussed below. Control circuitry 180 is arranged to receive the fault signals and, in response to receipt of a fault signal indicating a detection of a fault at one or more of the fault detection circuitries, to take one or more actions in response. Examples of such actions will be discussed below.

Note that although the control circuitry 180 may be part of the same apparatus or integrated circuit implementation as the remainder of the apparatus 100, in other examples the control circuitry is a so-called external control circuitry, which is to say it is implemented so as to operate (at least to an extent) independently of the apparatus 100. For example, the control circuitry 180 may be implemented as part of a separate and independently powered and/or clocked integrated circuit. In this way, the control circuitry 180 can provide a supervisory fault-handling function and (as discussed below) can operate to suspend operation of the remainder of the apparatus 100 in the case that faulty operation is detected. In such circumstances, the control circuitry 180 may be operable to transfer responsibility for at least some functionality handled by the apparatus 100 to another apparatus (not shown, but which again may be implemented as an independently powered and/or clocked integrated circuit). An example in which this can be useful is in so-called functional safety (FuSa) applications such as automotive control systems, in which faulty circuit operation could have real world safety implications. Suspending operation of a faulty apparatus (or at least one detected to be faulty or potentially faulty according to the detection techniques discussed here) and passing control to another reserve apparatus could provide improved real world safety in such circumstances.

Figure 9:
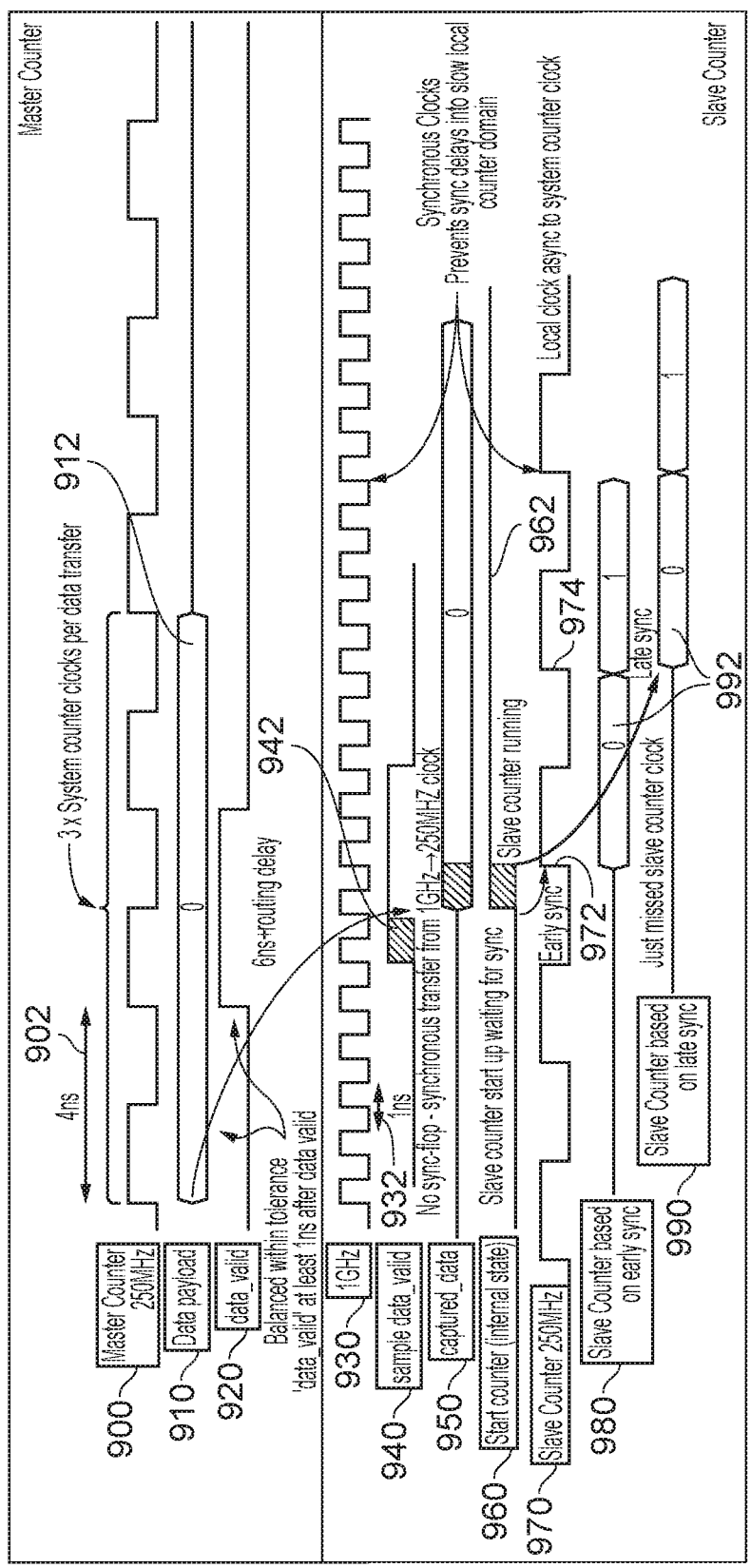
FIG. 9 schematically illustrates an initialisation process.
Figure 10:
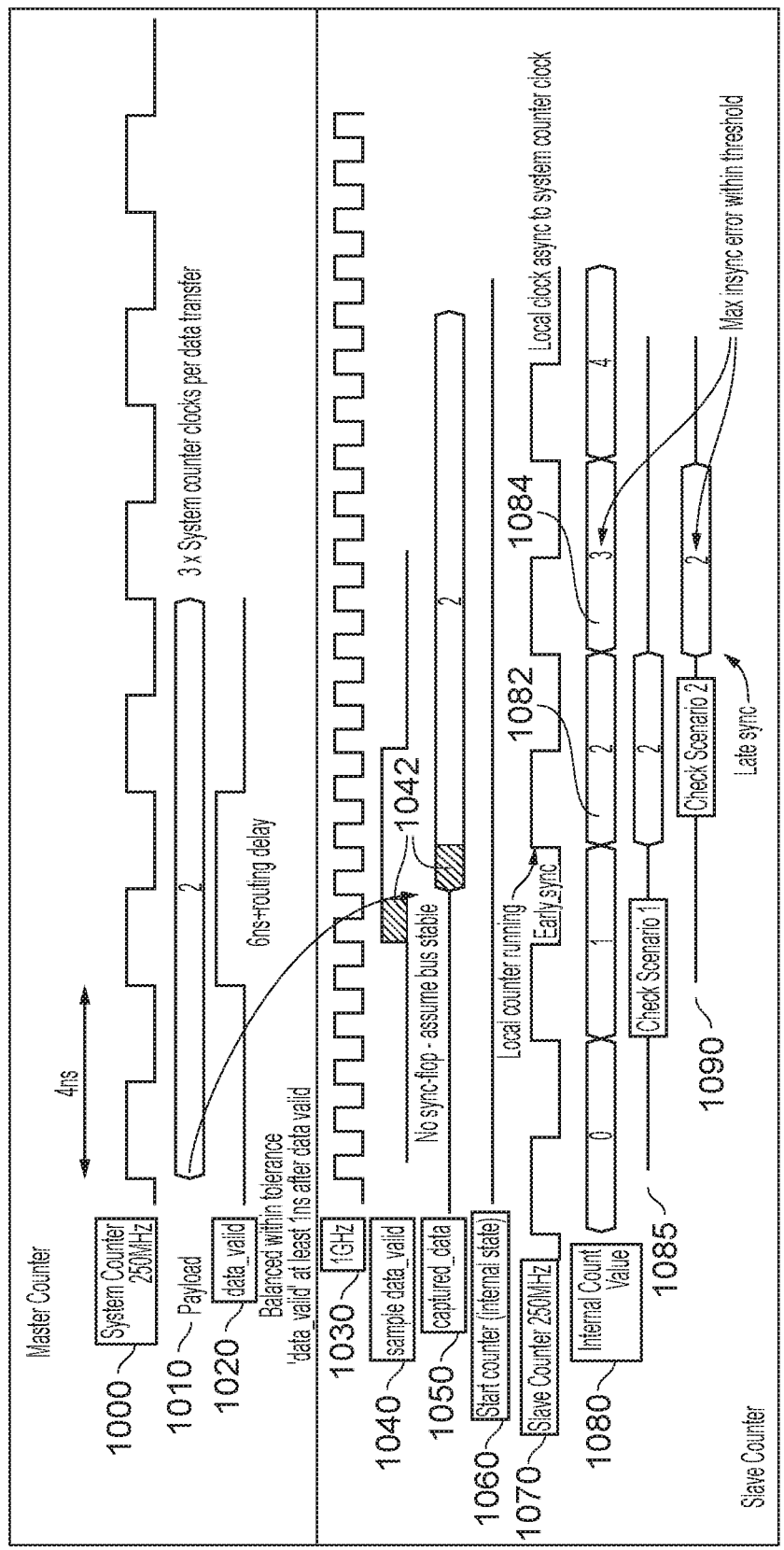
FIG. 10 schematically illustrates a fault detection process.

FIG. 1 therefore provides an example of apparatus comprising:

master counter circuitry 150 to generate a master count signal in response to a clock signal;

slave counter circuitry 160, 170 responsive to the clock signal to generate a respective slave count signal, the slave counter circuitry having associated fault detection circuitry ("associated" implying that the fault detection circuitry 112 and/or 162, for example, detects faults in the operation of the corresponding slave counter 160); and a synchronisation connection 152 providing signal communication between the master counter circuitry and the slave counter circuitry, the master counter circuitry being configured to provide via the synchronisation connection:

initialisation data (see FIG. 6) at an initialisation operation; and fault detection data (see also FIG. 6, though with different status bit values) at a fault detection operation;

the initialisation data and subsequent fault detection data each representing respective indications of a state of the master count signal;

the slave counter circuitry being configured, during an initialisation operation for that slave counter circuitry, to initialise a counting operation of that slave counter circuitry in response to the initialisation data provided by the master counter circuitry (see FIG. 9); and the fault detection circuitry associated with the slave counter circuitry being configured, during a fault detection operation for that slave counter circuitry, to detect whether a counting operation of that slave counter circuitry generates a slave count signal which is within a threshold count difference of a fault detection count value dependent upon the fault detection data provided by the master counter circuitry (see FIG. 10).

Figure 2:
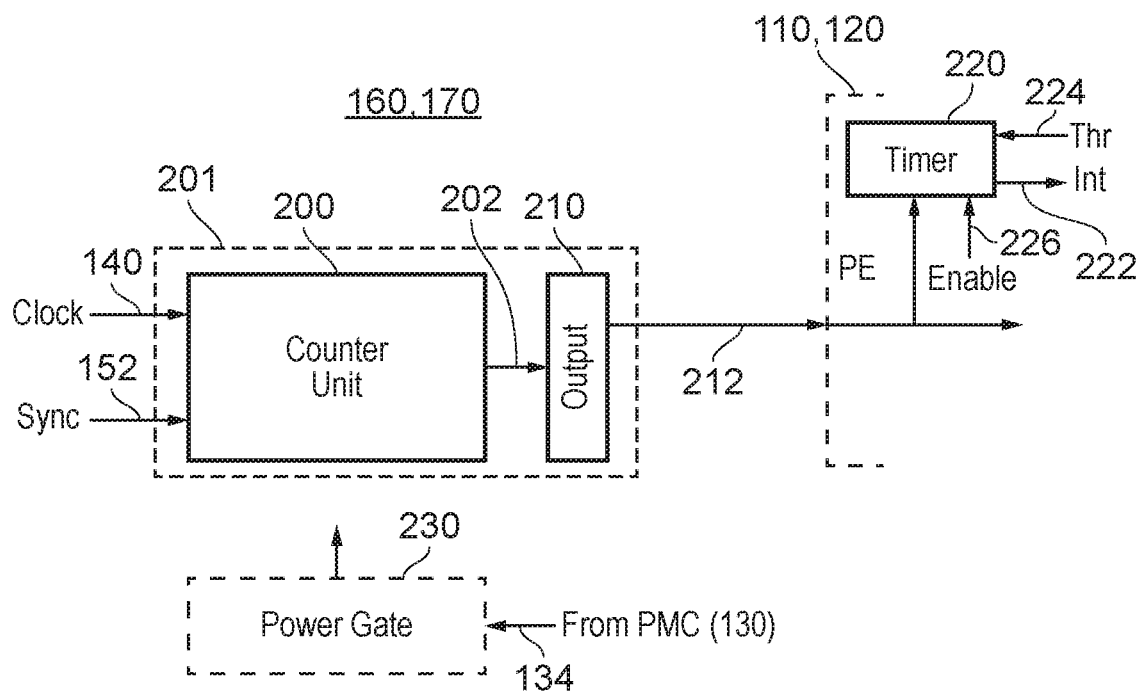
FIG. 2 schematically illustrates slave counter circuitry.

FIG. 2 schematically illustrates an example of slave counter circuitry, for example providing the function of the slave counter 160 or the slave counter 170 of FIG. 1.

The slave counter circuitry 201 of FIG. 2 comprises a counter unit 200 and an output latch 210. The slave counter circuitry operates under the control of a power gate 230 according to the control signal 134 from the power management circuitry 130. The power gate 230 may form part of the slave counter circuitry or may be an external power management component providing power to the slave counter circuitry.

Figure 3:
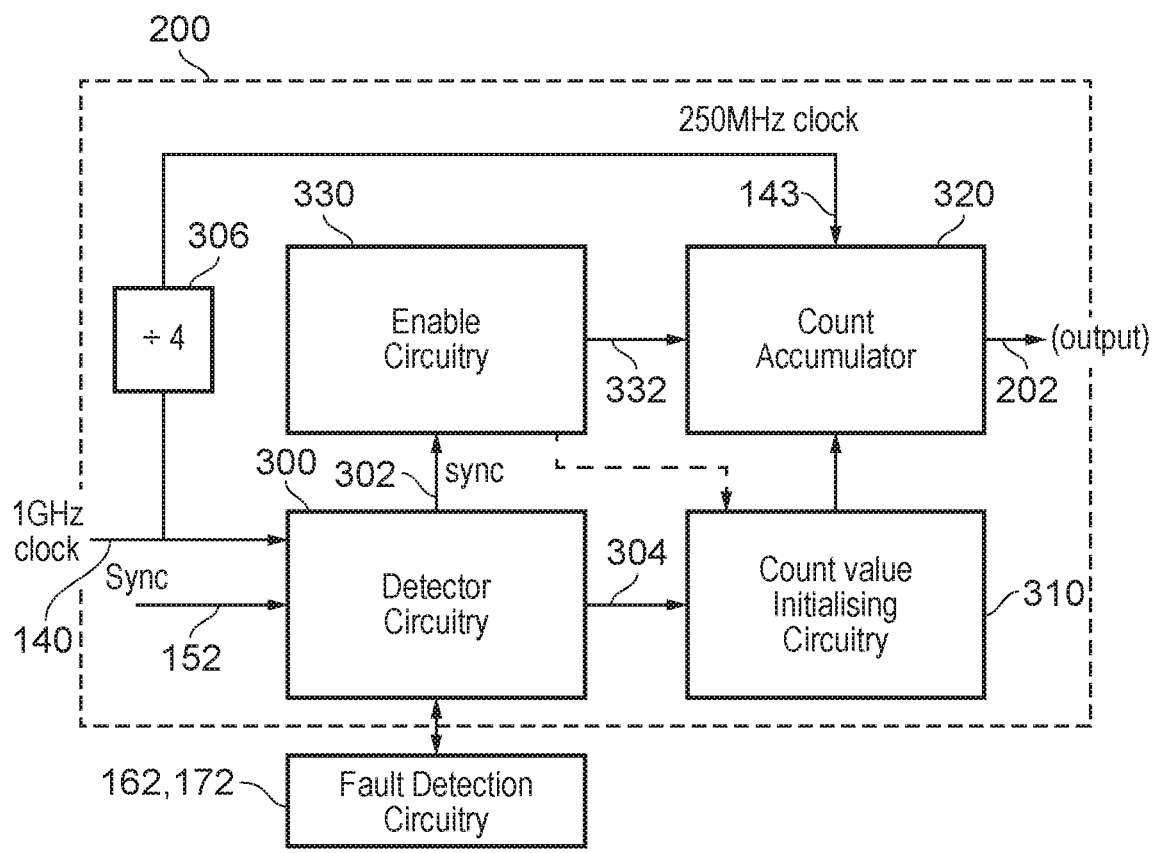
FIG. 3 schematically illustrates a counter unit.

The counter unit 200, shown in more detail in FIG. 3, is responsive to the 1 Ghz clock signal 140, at least in an example in which the 1 GHz clocks signal is the signal distributed around the apparatus, other alternatives are discussed above. The 1 GHz clock signal is divided by four by a divider 306 to generate the 250 MHz clock signal 143 in the basis of which counting is performed. The counter unit 200 is also responsive to the signal(s) communicated by the Sync data connection 152 to generate (when in the operational mode) a count output 202 which is latched by the output latch 210 and provided as an output 212 to the respective processing element 110, 120 or other device making use of the count output 202.

The processing element 110, 120 in these examples comprises a timer 220 which is responsive to the count output to generate one or more interrupt signals 222 to interrupt operations of the processing elements according to a comparison between one or more threshold count values 224 and a current counter output 212 as provided by the output latch 210. The processing element 110, 120 may provide an enable signal 226 to the timer 220. The count values output by the circuitry 201 are captured by the timer 220 only when the enable signal is asserted. Other aspects of the operation of the processing element 110 120 are not shown but it is noted that other uses may also (or instead) be made of the count values provided by the counter circuitry 201.

Referring to FIG. 3, which shows the counter unit 200 in more detail and which will be described in the context of the wider circuitry of FIG. 2, the signal(s) communicated by the Sync data connection 152 are provided to detector circuitry 300 which extracts, from the serial information provided by the Sync connection, a synchronisation pulse 302 (referred to as "data valid" in timing diagrams to be discussed below) and data 304 such as a scaling value (scale_val) to be discussed below and a count value. The meaning of the signals 302, 304 will be discussed below. The detector circuitry 300 interacts with the fault detection circuitry 162, 172 (and, where appropriate, with fault detection circuitry 112, 122 implemented by the PEs 110, 120), which in turn will be described in greater detail below.

In response to the scale_val and count value data, count value initialising circuitry 310 initialises a count state of a count accumulator 320. In response to the synchronisation pulse 302, enable circuitry 330 provides a control signal 332 to enable operation of the count accumulator to count cycles of the clock signal 140 in units or increments of the scaling value scale_val starting from the initialised values set by the count value initialising circuitry 310.

Figure 4:
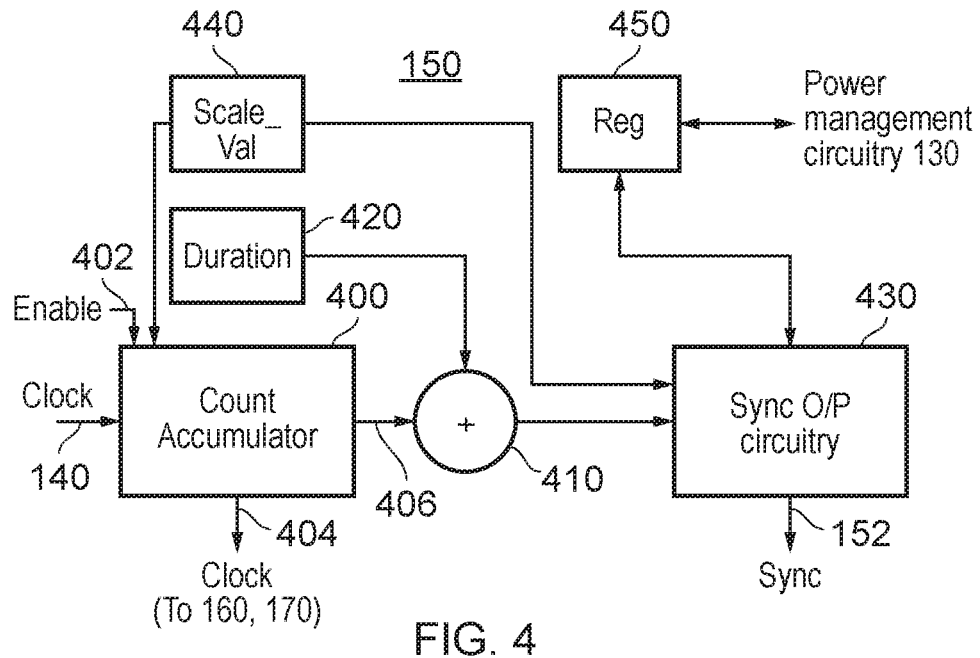
FIGS. 4 and 5 schematically illustrate examples of master counter circuitry.
Figure 5:
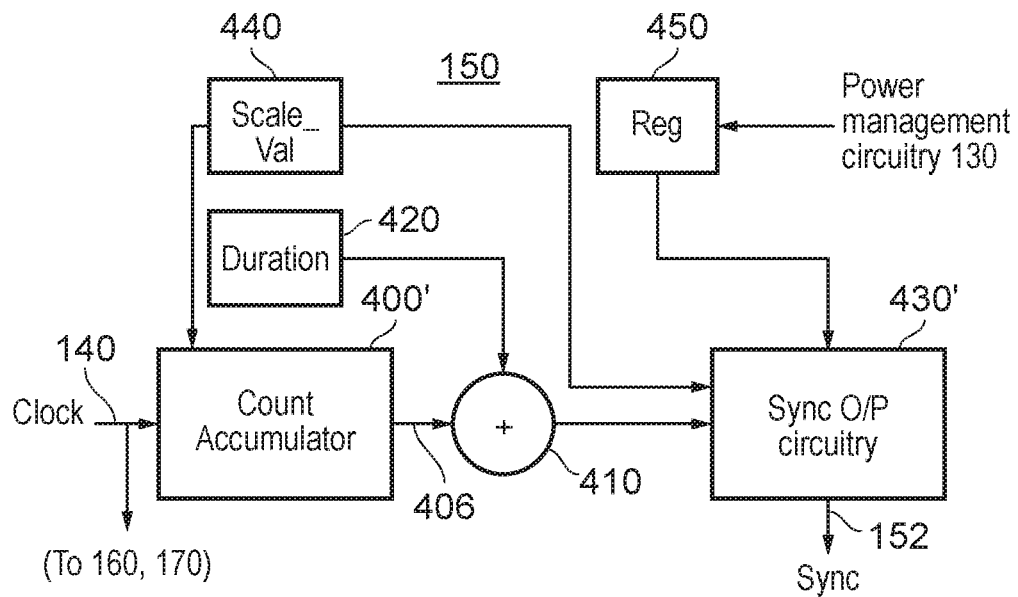

FIGS. 4 and 5 schematically illustrate examples of master counter circuitry 150. The two examples are similar in many respects, and matters which are common between FIGS. 4 and 5 will not be described twice.

Referring to FIG. 4, the master counter circuitry 150 comprises a count accumulator 400 responsive to the 250 MHz counter clock signal 140 (received directly or derived by a divider—not shown in FIG. 4—from the 1 GHz clock signal) and operating under the control of an enable signal 402. When enabled, the count accumulator passes the clock signal 140 as an output 404 to the slave counters 160, 170. When not enabled by the enabled signal 402, the count accumulator does not forward the clock signal as the output 404. This allows counting to be paused or suspended, for example for debugging purposes, such that if counting is paused at the master counter, it is also paused at the slave counters because the clock signal is not provided to the slave counters when the master counter's count accumulator 400 is not enabled. This arrangement corresponds to the broken line path 144 in FIG. 1, in which the master counter circuitry is configured to supply the clock signal to the slave counter circuitry.

The accumulated count output by the count accumulator 406 is provided to an adder circuit 410. The adder circuit 410 adds a current value of the accumulated count 406 to a "duration" value held by a register 420. This can be a predetermined duration value or can be calculated based on parameters of a current data communication (such as the length of a serial transmission required to transmit current synchronisation data). The purpose of the duration value is that it represents a time period (optionally, plus a margin), which will be taken to transmit data such as the count value and scale_val data using the synchronisation connection Sync to a slave counter.

Adding a duration value to the current accumulated count value gives a "future" count value which can be established at the slave counter and then, in response to a synchronisation pulse from the master counter, the operation of the slave counter can be started with effect from that future count value. So, by setting the future count value to be a current count value plus a duration value, the master counter can ensure that there is time to transmit the associated data (including data defining the future value) to the slave counter before issuing the synchronisation pulse to start counting at that value. In this way, the count value can indicate a count value applicable at a time that the timing signal is provided to the slave counter circuitry. This provides an example in which the adder circuit 410 acts as a count value generator configured to generate the count value to be sent to the slave counters in response to: a current state of the master count signal; and a time period to transmit the count value via the synchronisation connection.

In other example arrangements the duration value can be set to zero or this feature not provided at all.

The sum of the current count value 406 and the duration value from the register 420 is provided to sync output circuitry 430.

The sync output circuitry 430 is also responsive to a value scale_val held by a register 440. The purpose of scale_val will be discussed below.

Scale_val is optionally provided to allow for the use of so-called "scaled time". This term represents an arrangement in which respective parts of the system of FIG. 1 (including the master counter and slave counters) can operate with respect to a counting rate which is not necessarily the same as the actual rate of the counter clock 140. Indeed, the counting rate may not be a simple power-of-two submultiple of the counter clock 140. A ratio, scale_val, is used. Scale_val can be, for example, a fixed point value having integer and fractional parts. Scale_val can be set to one in some examples. A counter (the master counter or a slave counter) can count in units or increments of scale_val, although the count values output by that counter may represent only integer parts of the count values (the fractional parts may be used within the respective counter but are not necessarily exported as count values). This operation can be conducted at the master counter and separately (using the same scale_val for example) at the slave counter. Different slave counters can use respective different values of scale_val if required, though in the present examples to be discussed below a common scale_val is used.

Note that the provision and/or use of scale_val can be established at system design and/or by a configurable setting applicable to operation of the apparatus. If scale_val is not implemented or is configured not to be provided, a scaling of 1 (or another predetermined value) is assumed in the present examples, so that counting progresses in units of one clock cycle.

If a scale_val which is not equal to the predetermined value (such as 1) is provided, the same scale_val can (in at least example arrangements) be used by all counters in the system. In other words, the master counter circuitry and the slave counter circuitry are each configured to count in increments having an increment size dependent upon a scaling value.

Therefore, in examples, the master counter circuitry and the slave counter circuitry are configured to use a default scaling value equal to a predetermined value (such as 1); and the master counter circuitry is configured to provide to the slave counter circuitry a scaling value for use by the master counter circuitry and the slave counter circuitry in place of the default scaling value.

In the present arrangements, in order to initialise a slave counter, the slave counter is count-aligned with the master counter, which is to say that the slave count is set to the same as the master count at a synchronisation time determined by the timing or data_valid signal. But if scaled time is in use, the slave counter also needs to be initialised with an appropriate scale_val value. If scale_val is required in a particular arrangement, it is supplied as part of the synchronisation process using the techniques described here. Therefore, in these examples, the slave counter circuitry is configured to count in increments having an increment size dependent upon a scaling value and the master counter circuitry is configured to provide the scaling value to the slave counter circuitry.

The sync output circuitry 430 operates under the control of a control register 450. This can be a single-bit register, although in other examples it could store further information such as the identity of a particular slave counter to be synchronised.

In the example of FIG. 4, the register 450 can be written to and read by the power management circuitry 130. In a technique to be described below, the power management circuitry sets the register 450 to a particular state, such as writing a "1" to the register 450, in order to cause an initialisation operation to take place. At the end of the initialisation operation, which is to say, when the sync output circuitry 430 has issued a synchronisation pulse (data_valid), the sync output circuitry 430 resets the register 450 to its original state which can indicate that subsequent synchronisation operations, at least until a reset of the master counter, are performed (from the point of view of the master counter) as fault detection operations. These types of operation will be discussed further below. Also the format of signals output by the sync output circuitry will be discussed below with reference to example timing diagrams.

Referring to FIG. 5, as mentioned above, much of the circuitry is in common with FIG. 4. The differences will be discussed here.

In the example of FIG. 5, the broken line path 142 of FIG. 1 is used for the clock signal, so the clock signal 140 is not routed to the slave counters via the count accumulator 400, but instead is routed directly to them. This means that the clock signal 140 is not gated by the count accumulator 400 under the control of the enabled signal 402. Note that an enable signal could be provided to the count accumulator 400', but is not shown in FIG. 5 since its use is not relevant to the particular operations being described.

FIG. 6 schematically illustrates an example format of initialisation data and fault detection data as sent from the master counter to the slave counter(s). Note that the same payload format is used in both instances (initialisation data and fault detection data) in these examples, partly in order that a slave counter, such as a slave counter which has just been returned from the quiescent state to an active state by the power management circuitry 130 can in fact be initialised using a transmission of fault detection data. However, other examples in which the fault detection data has a different format to that of the initialisation data will be discussed below. This provides an example in which power management circuitry 130 is provided to control transitions of the slave counter circuitry between an operational state and a quiescent state; in which the slave counter circuitry is configured to execute an initialisation operation in response to a first instance of fault detection data received by that slave counter circuitry after a transition of that slave counter circuitry from the quiescent to the operational state.

The data payload shown in FIG. 6 comprises a 64 bit count value 610, a 32 bit scale_val 620 and a pair of status flags $S_1$, $S_0$ 630. An error detecting code, in this example an 8 bit cyclic redundancy check code (CRC) 640 is also provided in order to assist in the detection of data errors in the remainder 600 of the payload. Note that different sizes of the various portions of the payload and indeed the CRC could be used. For example, in a system using count values of fewer that (or more than) 64 bits, the field 610 could be adjusted so as to encompass the count value size in use.

Therefore, in these examples, an initialisation data packet is identical in format to a fault detection packet, except for the different states of the status flags. This means that either packet can be used to initialise a slave counter which has just been powered up from the quiescent state. However, for a slave counter which is already powered up and which has already undergone an initialisation operation (such that its counter is already in operation), the expectation is that an initialisation data packet will be handled so as to set the counting parameters of the slave to the newly received values, whereas for a received fault detection data packet, the parameters will be used to check and affirm the ongoing operation of the slave counter.

FIG. 7 schematically illustrates the status field 630 and in particular states associated with different values of the status flags $S_1$, $S_0$.

The states 00 and 01 are both invalid from the point of view of taking action at the slave counter(s) on the basis of the received payload.

The status field 10 indicates a valid payload, which is to say one on the basis of which action should be taken by the slave counter(s), relating to the initialisation process. In other words, the scale value and count value provided in the fields 620, 610 should be used to initialise corresponding values at the slave counter(s).

The status field 11 indicates valid data relating to a fault detection process. Again, a scale value and count value are provided and their use in fault detection will be discussed below.

FIG. 8 is a schematic state diagram illustrating the use of initialisation and fault detection data.

From a starting position at the left hand side of FIG. 8 as drawn, a system reset or power-on of the master counter leads to a status of 00 or initialised. The master counter then generates initialisation data transmitted using data 10 in order to initialise the slave counter(s). After that, for example under the control of the register 450 as discussed above, fault detection data is transmitted with status field 11. This may be transmitted on a repetitive basis, which is to say multiple successive fault detection data are transmitted, for example on a predetermined periodicity or at least subject to a maximum threshold time interval between successive transmissions of fault detection data. This provides an example in which the synchronisation connection provides serial communication of the initialisation data and the fault detection data, and in which the master counter circuitry is configured to provide either the initialisation data or the fault detection data at time intervals of no more than a threshold time interval. The threshold time interval may be selected in dependence upon the application of the apparatus. For example in a safety related application, it may be appropriate to use a relatively short interval of (say) a few milliseconds, so that a fault can be quickly detected and the apparatus (for example, the apparatus 100, and/or an SoC performing safety critical operations) suspended rapidly. For example, the arrangement allows a fault to be detected within a predetermined fault detection interval which may be established at design or by a configurable parameter.

From the point of view of the master counter, a transmission is either initialisation data or fault detection data. In particular, the first transmission of a series is used as the initialisation data and any subsequent transmissions, at least until the master counter is controlled to re-initialise the count values (for example by the power management circuitry 130 writing to the register 450), are fault detection data. The master counter sets the status field 630 accordingly. However, at a slave counter, as noted above, an instance of fault detection data may in fact be used for initialisation, for example in a situation where the slave counter has just been re-powered up after a period in the quiescent state.

As mentioned above, the use of fault detection data to provide initialisation is enabled at least in part by the fact that fault detection data in this example contains a full 64 bit count value and a full 32 bit scale value. It is possible, however, to use a different arrangement. For example, the fault detection data does not necessarily need to include the scale value 620 and could include, for example, only a certain number of least significant bits of the count value, on the basis that a properly initialised slave counter, operating correctly, could only have changed those least significant bits in the period since the last initialisation data was sent. So, it is not in fact a requirement that the two types of data (initialisation and fault detection) have the same format, but given the advantages discussed above, that arrangement is used in the present examples.

FIGS. 9 and 10 are schematic timing diagrams with FIG. 9 illustrating an initialisation process and FIG. 10 illustrating a fault detection process.

Referring to FIGS. 6, 9 and 10, the initialisation data and the fault detection data comprise respective instances of (i) data 610 indicative of a count value and (ii) a timing signal data_valid defining a timing relationship between the clock signal and the count value. The count value may indicate a count value applicable at a time that the timing signal is provided to the slave counter circuitry.

The timing diagrams assume that the clock signals provided to the master counter 150 and the slave counters 160, 170 have identical frequencies, although because of various potential propagation delays, the phase relationship between the clock sources for the master counter and the slave counters may be unpredictable (though may well be constant over time). In previously proposed integrated circuits, in which the same master clock signal is propagated around the integrated circuit and used to derive the counter clocks at each of the master and slave counters, it has generally been a requirement to provide phase-aligned clock signals throughout the integrated circuit. This could be an onerous requirement in some previous instances, so an advantage of the present arrangement is that aligned clocks are not needed and a phase difference between the clock signal used by the master counter and the clock signal used by a slave counter can be tolerated. In other words, the slave counters can operate from a clock source which potentially has a particular non-zero phase relationship with the clock source of the master counter. The potentially non-zero phase relationship can be the same for all slaves or can potentially be different for different respective slaves.

As mentioned above, counting is performed on the basis of the 250 MHz clock signal which is derived by a divider from the 1 GHz clock signal. The 1 GHz clock signal is used for the sampling of data signals provided by the master counter to the slave counters.

Referring to FIG. 9, an upper row 900 represents successive cycles of the 250 MHz clock on which the master counter performs its counting operations. As shown, a period of the 250 MHz clock 902 lasts for 4 ns.

As part of the signal carried by the Sync data connection 152, the data payload shown in FIG. 6, including the CRC value 640, is transmitted to the slave counters at a line 910 of FIG. 9. In some examples, this data payload can be transmitted serially, for example, one bit at a time (for example, by a single conductor) and a single bit may be transmitted for a duration lasting more than one clock cycle. This is illustrated schematically in FIG. 9 as an example of a serial data transmission 912 of the last bit of the data payload being held for 3 cycles of the 250 MHz clock. In other examples, taking into account the 106 bits of the packet shown in FIG. 6, these could be transmitted by x conductors, as x bits per clock cycle or per group of clock cycles, so that 1/x of these bits are transmitted at each transmission instance (an instance being a cycle or group of cycles of the 250 MHz clock signal).

The transmitted bits are received at the slave counter somewhat later, by virtue of propagation delays between the master counter and the slave counter, as indicated schematically by a line 950 of FIG. 9.

Also as part of the signal(s) provided by the Sync data connection 152, a data valid signal or timing signal is provided as shown by a line 920 of FIG. 9. This indicates a time point at which the count value 610 provided by the initialisation data is considered valid. In the example of FIG. 9, this data_valid signal is asserted during the transmission 912 of the last bit of the data payload. In other examples, data_valid could be asserted at each bit (or bundle or group of bits) transmitted, with for example the assertion of data_valid for the last bit or bundle/group of bits indicating the time point relevant to this discussion. In other examples, such as where a "future value" of the count value is transmitted as discussed above, the data_valid signal could be transmitted after the transmission of the payload.

In other examples, however, the data_valid signal could be implied, for example by a "stop bit" indicating the end of a packet transmission, or by a particular number of clock cycles or a particular period elapsing from a "start bit" indicating the start of a packet, or by the transmission of the last data bit or another predetermined data bit of the packet. Depending on which arrangement is used of those discussed above, the data_valid signal (if explicitly provided) may be transmitted using the same or a different conductor or serial link forming part of the Sync data connection 152. A line 930 of FIG. 9 schematically represents the 1 GHz clock signal with a period 932 of 1 ns. This clock signal controls the sampling of the data valid signal as shown by a line 940 of FIG. 9. Because there could be any phase relationship between the 1 GHz clock as seen at the slave counter and the 250 MHz clock as seen at the master counter, there is a level of uncertainty, represented by a shaded block 942 regarding the exact stage and the exact clock cycle of the 1 GHz clock at which the slave counter samples the data valid signal. A similar level of uncertainty applies to the timing at which the captured data is detected at the line 950.

At a line 960, the slave counter is enabled for initial operation by a rising edge of an enable signal 962. Once again, a shaded block indicates the temporal uncertainty of when this enabling takes place, depending on this prevailing relationship between the 1 GHz clock at the slave counter and 250 MHz clock at the master counter. Depending on where the synchronisation takes place relative to the slave counter's 250 MHz clock signal, the slave counter could be enabled for operation at a rising edge 972 of the local 250 MHz clock 970 or at a next rising edge 974. In the case of the edge 972, the resulting operation of the slave counter is shown as a line 980 and in the case of the rising edge 974, the operation of the slave counter is shown as a line 990. So, it can be seen that a one cycle (of the 250 MHz slave clock) discrepancy can arise simply because of the phase relationship between the 1 GHz clock at the slave counter and the 250 MHz clock at the master counter.

A final note on FIG. 9 is that the initialisation data shown in the line 910 contained a 64 bit count value. The transmission 912 as drawn in FIG. 9 provided the last bit of the data payload but for convenience of the following discussion, the overall value of the count value (rather than just its last bit) is illustrated schematically as "0". This is the starting value for counting operation in the first count cycle 992 either in the line 980 or the line 990 in FIG. 9.

Therefore FIG. 9 provides an example in which the slave counter circuitry is configured, during an initialisation operation for that slave counter circuitry, to initialise a counting operation of that slave counter circuitry to start counting from a count value (0 in this example) dependent upon the count value, with effect from a start time 972, 974 dependent upon the timing signal provided by the master counter circuitry.

FIG. 10 schematically illustrates a fault detection process. Here, lines 1000, 1010, 1020, 1030, 1040, 1050 represent the same process as described above with reference to lines 900 . . . 950 of FIG. 9, except that the count value 610 transferred from the master counter is in this case "2" and, instead of a status field of 10 in FIG. 9 (indicating an initialisation process), a status field of 11 indicating a fault detection process is used in FIG. 10.

At a line 1060 of FIG. 10, the internal state of the start counter control of the slave counter is shown as active, indicating that the slave counter is already running. The internal count value of the slave counter is shown as a line 1080 relative to cycles of the 250 MHz clock 1070.

As before, the data valid signal indicates a time at which the count value 610 transmitted at the line 1010 is valid, and as part of the fault detection process the received count value as part of the fault detection data is compared with the current value of the slave counter. Once again, however, uncertainty in relative timing between the slave counter 1 GHz clock and the master counter 250 MHz clock, indicated by shaded portions 1042 in FIG. 10, means that the checking process may take place at a cycle 1082 or at a cycle 1084 of the slave counter operation. These outcomes are shown as lines 1085, 1090 of FIG. 10.

Referring to the line 1085, the count value of the received fault detection data ("2") is identical to the slave counter's internal count value. In the situation of the line 1090, however, the slave counter is one cycle ahead and so has a count value "3". However, this difference (of 1 in this example) is within a threshold count difference (which may be, for example, two count values or more generally, n increments of the scaling value scale_val, where n is an integer value of at least one. It is therefore not treated as a fault situation. If, however, the difference were more than the threshold count difference, then a fault signal or error signal would be generated by the fault detection circuitry. This is therefore an example in which the threshold count difference is n increments of the scaling value, where n is an integer and n is at least one.

Therefore in FIG. 10, which the fault detection count value (2 in this example) is dependent upon the data indicative of the count value at a time dependent upon the timing signal data_valid of the fault detection data provided by the master counter circuitry for that fault detection operation.

Figure 11:
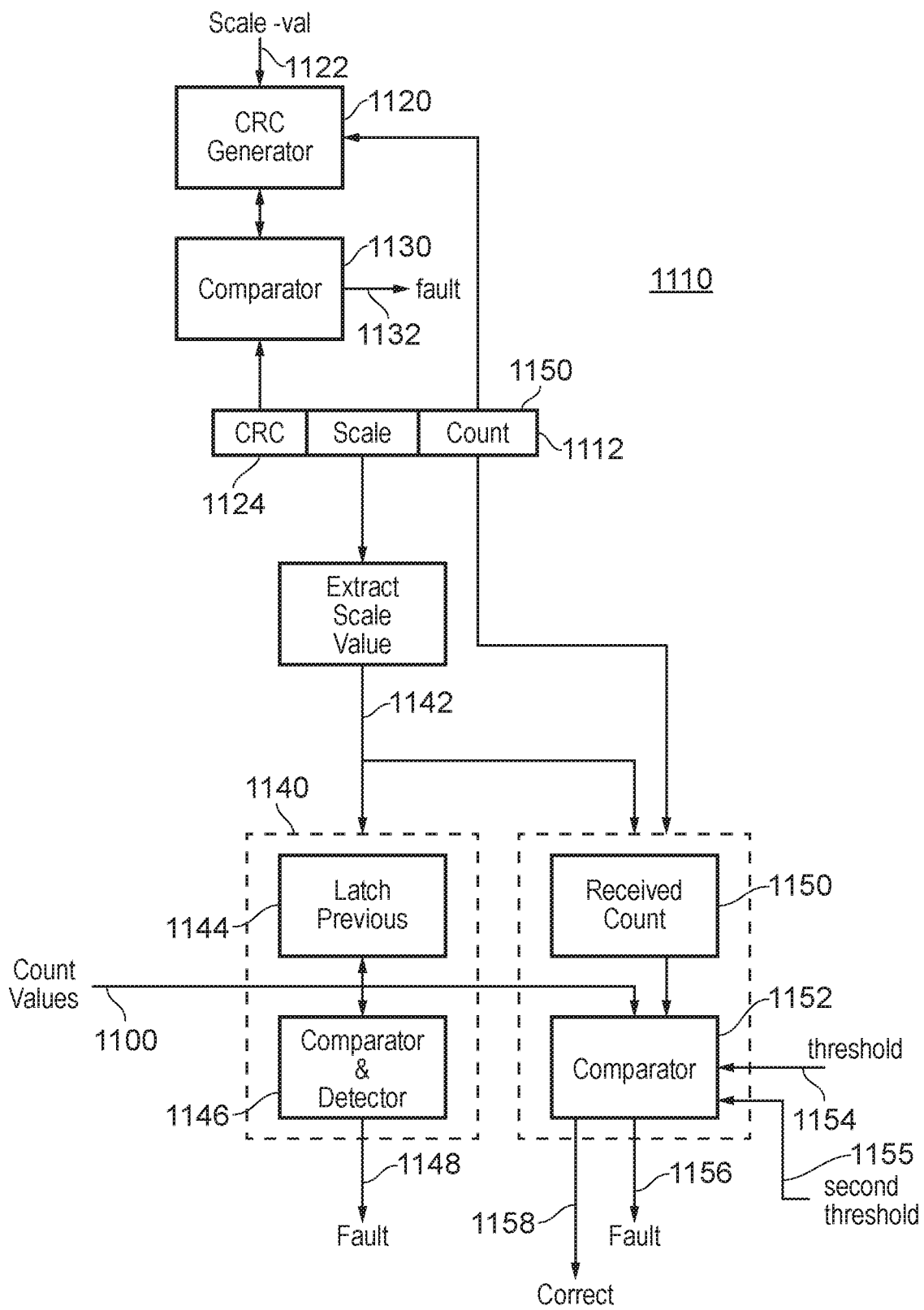
FIG. 11 schematically illustrates a fault detection circuitry.

FIG. 11 schematically illustrates an example of fault detection circuitry 112, 122, 162, 172 in relation to a particular slave counter (and its associated processing element(s)) generating successive count values 1100. The fault detection circuitry 1110 is responsive to fault detection data 1112 received from the master counter 150. Three examples of fault detection functionality are shown in FIG. 11, of which any one or more (or all three) may be provided.

Note that although respective portions of the fault detection circuitry of FIG. 11 are all drawn together for the purposes of this explanation, they may in fact be provided at the slave counter itself (as circuitry 162, 172) and/or at the device using or consuming the count values (as circuitry 112, 122).

For example, a circuitry portion 1140 which (as discussed below) performs a consistency check on the successive count operations of the slave counter may be more appropriately provided at the processing element so as to provide a degree of independence in its verification of the operation of the slave counter. Otherwise, if the slave counter comprises circuitry to check its own consistency, it could be possible that a fault at the slave counter actually results in an error in its own consistency-checking operation. There is therefore a potential risk that similar or common mode faults in the counter operation and the counter's own consistency-checking operation mean that the fault might not be detected. To alleviate this risk, in the present examples the circuitry portion 1140 is provided at the PEs 110, 120 rather than at the slave counters themselves.

In a first example of operation, a CRC generator 1120 generates a locally generated CRC value (using the received status bits if the status bits are indeed subject to the CRC check process) from the received count value 1150, the current scale value 1122 in use by the slave counter and the notional status bits 11 so as to produce a representation of the CRC value which should be present in the newly received fault detection data 1112 from the master counter. A comparator 1130 compares the newly generated CRC value and the received CRC value 1124 and flags a fault signal 1132 if the two CRC values are different.

This provides an example in which the master counter circuitry is configured to generate a first error detection value (such as an ECC) in dependence upon at least the count value of the fault detection data and to include the first error detection value as part of the fault detection data; and the fault detection circuitry is configured to generate a second error detection value in dependence upon at least the count value of the fault detection data and to compare the first and second error detection values. For example, the fault detection data comprises a scaling value and status data differentiating the fault detection data from initialisation data; and the first and second error detection values are dependent upon the scaling value and the status data.

In a second example of operation, a fault detection arrangement 1140, responsive to the scale value 1142 indicating an increment between successive count values, comprises a latch circuit 1144 to latch a previous count value 1100 output by the slave counter and a comparator 1146 to compare the previous count value with the current count value 1100 and to detect whether they differ by the scale value 1142. If they do not differ by the scale value 1142 (a situation which would apply assuming a correct operation of the slave counter) then a fault signal 1148 is issued. This provides an example in which the fault detection circuitry is configured to detect whether successive count values generated by the slave counter circuitry differ from one another by the scaling value. Note that as discussed above, this functionality can usefully be provided as part of the operation of a unit or device which uses the count value, such as part 112, 122 of the operation of the respective processing element 110, 120, so as to avoid so-called common mode erroneous operation of the slave counter leading to a failure to detect a fault condition.

In a third mode of operation, corresponding to that shown in FIG. 10, the received count value 1150 from the master counter is compared with the current count value 1100 by a comparator 1152. If the two count values differ in magnitude by more than a threshold count value 1154 then a fault signal 1156 is issued. This provides an example in which the fault detection circuitry is configured to generate an error signal in response to a detection that a counting operation of that slave counter circuitry generates a slave count signal which differs by more than the threshold count difference from the fault detection count value.

As an optional feature, if the two count values (received and current) differ by more than a second threshold count value (a "correction threshold") m 1155 (lower than or equal to the threshold count value 1154 but an integer value of at least one) but the two count values do not differ by more than the threshold count value n 1154 (expressed as a count difference and/or a number of increments of scale_val) then a fault signal is not issued but instead a correction signal 1158 is issued to the slave counter. The purpose and use of the correction signal 1158 will be discussed with reference to FIGS. 12A to 12C.

Referring to FIG. 12A, in which the slave count lags behind the received count value, successive count values generated by the slave counter are shown, along with the count value received from the master counter as part of the fault detection signal, time-aligned (by the received data_valid signal) with the count values output by the slave counter. It can be seen that the time-aligned count from the fault detection data (4) corresponds to a slave count of 3. So, in this example, there is a difference of one. Assuming that m increments of scale_val (the threshold for correction) is 1 and n (the threshold for signalling a fault) is greater than one, the difference of one in FIG. 12A will be flagged as a correction by the comparator 1156 and used (for example by a controller 1200 of FIG. 12C forming part of the slave counter) to control the internal count value at that slave counter to jump forward by one count, for example at a time point 1210. Note that this complies with the condition discussed above that a count value can never be seen to be going backwards. Once the correction has been applied, and assuming correct operation of the slave counter, a subsequent fault detection operation will detect proper alignment between the slave counter and the received fault detection data as time-aligned by the data_valid signal.

Note that if a difference of (say) two was detected, and assuming that m is 1 and n is greater than 2, then either a positive correction of two counts could be applied as a single operation at the time point 1210 (so that the sequence in FIG. 12A would be 2, 3, 6, 7 . . . ) or a correction of +1 could be applied as shown in FIG. 12A, with a next fault detection operation still detecting a discrepancy of one so that another correction of +1 is applied. Therefore, a detected discrepancy of greater than one count can be handled by a single correction or by multiple successive smaller corrections.

As discussed, similar principles apply where a scale_val is used. Here, the tests apply to increments between successive clock values equal to scale_val. The thresholds such as n, m can be expressed as numbers (such as 1, 2) to be multiplied by scale_val or by multiples of scale_val.

In FIG. 12B, in which the slave count is ahead of the received count value, the time-aligned fault detection data count value (2 in this example) is found to be smaller than the corresponding slave count, so a negative correction is needed to the slave count. However, bearing in mind the constraint that count values can never be seen to go backwards, the correction may be applied by the controller 1200 controlling the slave counter to hold the slave count value constant for one or more additional count cycles. An example of one count cycle is shown, from a time point 1220, in FIG. 12B. If a discrepancy of more than one negative count value (or more than 1×scale_val in a negative sense) is detected then either the count value can be held for multiple cycles or multiple successive smaller corrections can be implemented at respective fault detection operations.

These arrangements provide an example in which the threshold count difference is an integer number n of increments of the scaling value, where n is at least two; and in the case of a detection by the fault detection circuitry that a difference between the slave count signal and the fault detection count value is at least m increments of the scaling value, where m is an integer equal to at least one, but is less than the threshold count difference, the fault detection circuitry is configured to control the slave counter circuitry to apply a count correction operation (such as increasing the count between successive cycles by more than a normal increment, or holding the count value constant for more than one cycle) to reduce the magnitude of the difference.

FIG. 13 schematically illustrates an example of control circuitry 180 comprising a detector 1300 configured to receive fault signals 1310 from the various fault detection circuitries applicable to each slave counter and a controller 1320 configured to issue a control signal 1330 to control operations of the master counter 150 and the power management circuitry 130 by control signals 182, 184 respectively, for example to initiate a suspension of operation of the apparatus.

Note that as mentioned above the control circuitry 180 may be external to the apparatus, for example as part of another integrated circuit, and may optionally initiate operation of (or handling over of operation to) a second, separate, apparatus in response to detection of a fault condition leading to the suspension of the operates of a first apparatus.

In some examples, if a single fault signal is received then suspension of operation of the entire operation of the entire apparatus of FIG. 1 can be initiated by the control signal 1330.

If more than one fault signal is detected at substantially the same time (for example, within a period defined by adjacent clock cycles of the 250 MHz counter clock), then a further signal 1332 can be generated to indicate, for example for debugging purposes, that a potential fault exists at the master counter. This provides an example in which the apparatus comprises two or more slave counter circuitries, in which the control circuitry is configured to detect whether two or more of the slave counter circuitries generate the error signal at substantially the same time.

FIG. 13 therefore provides an example of control circuitry to initiate (for example, via a communication with the power management circuitry) a suspension of operation of the apparatus in response to the error signal.

Finally, FIG. 14 is a schematic flowchart illustrating a method comprising:

master counter circuitry generating (at a step 1400) a master count signal in response to a clock signal;

slave counter circuitry generating (at a step 1410) a respective slave count signal the master counter circuitry providing (at a step 1420) to the slave counter circuitry via the synchronisation connection: initialisation data at an initialisation operation; and fault detection data at a fault detection operation; the initialisation data and subsequent fault detection data each representing respective indications of a state of the master count signal;

the slave counter circuitry, during an initialisation operation for that slave counter circuitry, initialising (at a step 1430) a counting operation of that slave counter circuitry in response to the initialisation data provided by the master counter circuitry; and fault detection circuitry associated with the slave counter circuitry detecting (at a step 1440), during a subsequent fault detection operation for that slave counter circuitry, whether a counting operation of that slave counter circuitry generates a slave count signal which is within a threshold count difference of a fault detection count value dependent upon the fault detection data provided by the master counter circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Apparatus comprising:
   master counter circuitry to generate a master count signal in response to a clock signal;
   slave counter circuitry responsive to the clock signal to generate a respective slave count signal, the slave counter circuitry comprising having associated fault detection circuitry; and
   a synchronisation connection providing signal communication between the master counter circuitry and the slave counter circuitry, the master counter circuitry being configured to provide via the synchronisation connection:
      initialisation data at an initialisation operation; and
      fault detection data at a fault detection operation;
   the initialisation data and subsequent fault detection data each representing respective indications of a state of the master count signal;
   the slave counter circuitry being configured, during an initialisation operation for that slave counter circuitry, to initialise a counting operation of that slave counter circuitry in response to the initialisation data provided by the master counter circuitry; and
   the fault detection circuitry associated with the slave counter circuitry being configured, during a fault detection operation for that slave counter circuitry, to detect whether a counting operation of that slave counter circuitry generates a slave count signal which is within a threshold count difference of a fault detection count value dependent upon the fault detection data provided by the master counter circuitry.

2. Apparatus according to claim 1, in which the initialisation data and the fault detection data comprise respective instances of (i) data indicative of a count value and (ii) a timing signal defining a timing relationship between the clock signal and the count value.

3. Apparatus according to claim 2, in which the slave counter circuitry is configured, during an initialisation operation for that slave counter circuitry, to initialise a counting operation of that slave counter circuitry to start counting from a count value dependent upon the count value, with effect from a start time dependent upon the timing signal provided by the master counter circuitry.

4. Apparatus according to claim 3, in which the fault detection count value is dependent upon the data indicative of the count value at a time dependent upon the timing signal of the fault detection data provided by the master counter circuitry for that fault detection operation.

5. Apparatus according to claim 1, in which the master counter circuitry and the slave counter circuitry are each configured to count in increments having an increment size dependent upon a scaling value.

6. Apparatus according to claim 5, in which:
   the master counter circuitry and the slave counter circuitry are configured to use a default scaling value equal to a predetermined value; and
   the master counter circuitry is configured to provide to the slave counter circuitry a scaling value for use by the master counter circuitry and the slave counter circuitry in place of the default scaling value.

7. Apparatus according to claim 5, in which the threshold count difference is n increments of the scaling value, where n is an integer and n is at least one.

8. Apparatus according to claim 5, in which:
   the threshold count difference is an integer number n of increments of the scaling value, where n is at least two;
   in the case of a detection by the fault detection circuitry that a difference between the slave count signal and the fault detection count value is at least m increments of the scaling value, where m is an integer equal to at least one, but is less than the threshold count difference, the fault detection circuitry is configured to control the slave counter circuitry to apply a count correction operation to reduce the magnitude of the difference.

9. Apparatus according to claim 5, in which the fault detection circuitry is configured to detect whether successive count values generated by the slave counter circuitry differ from one another by the scaling value.

10. Apparatus according to claim 2, in which:
    the master counter circuitry is configured to generate a first error detection value in dependence upon at least the count value of the fault detection data and to include the first error detection value as part of the fault detection data; and
    the fault detection circuitry is configured to generate a second error detection value in dependence upon at least the count value of the fault detection data and to compare the first and second error detection values.

11. Apparatus according to claim 10, in which:
    the fault detection data comprises a scaling value and status data differentiating the fault detection data from initialisation data; and
    the first and second error detection values are dependent upon the scaling value and the status data.

12. Apparatus according to claim 1, in which the fault detection circuitry is configured to generate an error signal in response to a detection that a counting operation of that slave counter circuitry generates a slave count signal which differs by more than the threshold count difference from the fault detection count value.

13. Apparatus according to claim 12, comprising control circuitry to initiate a suspension of operation of the apparatus in response to the error signal.

14. Apparatus according to claim 12, the apparatus comprising two or more slave counter circuitries, in which the control circuitry is configured to detect whether two or more of the slave counter circuitries generate the error signal at substantially the same time.

15. Apparatus according to claim 1, in which the synchronisation connection provides serial communication of the initialisation data and the fault detection data, and in which the master counter circuitry is configured to provide either the initialisation data or the fault detection data at time intervals of no more than a threshold time interval.

16. Apparatus according to claim 1, in which the count value indicates a count value applicable at a time that the timing signal is provided to the slave counter circuitry.

17. Apparatus according to claim 16, in which the master counter circuitry comprises a count generator configured to generate the count value in response to:
   a current state of the master count signal; and
   a time period to transmit the count value via the synchronisation connection.

18. Apparatus according to claim 1, comprising:
   power management circuitry to control transitions of the slave counter circuitry between an operational state and a quiescent state;
   in which the slave counter circuitry is configured to execute an initialisation operation in response to a first instance of fault detection data received by that slave counter circuitry after a transition of that slave counter circuitry from the quiescent to the operational state.

19. An integrated circuit comprising apparatus according to claim 1.

20. A method comprising:
   master counter circuitry generating a master count signal in response to a clock signal;
   slave counter circuitry generating a respective slave count signal;
   the master counter circuitry providing to the slave counter circuitry via the synchronisation connection:
      initialisation data at an initialisation operation; and
      fault detection data at a fault detection operation;
   the initialisation data and subsequent fault detection data each representing respective indications of a state of the master count signal;
   the slave counter circuitry, during an initialisation operation for that slave counter circuitry, initialising a counting operation of that slave counter circuitry in response to the initialisation data provided by the master counter circuitry; and
   fault detection circuitry associated with the slave counter circuitry detecting, during a subsequent fault detection operation for that slave counter circuitry, whether a counting operation of that slave counter circuitry generates a slave count signal which is within a threshold count difference of a fault detection count value dependent upon the fault detection data provided by the master counter circuitry.

* * * * *